(12) United States Patent
Geppert et al.

(10) Patent No.: US 7,275,914 B2
(45) Date of Patent: Oct. 2, 2007

(54) PELTON BUCKET

(75) Inventors: Lothar Geppert, Zürich (CH); Christoph Scharer, Pfäffikon (CH)

(73) Assignee: VA Tech Hydro GmbH, Vienna (AT)

( * ) Notice: Subject to any disclaimer, the term of this patent is extended or adjusted under 35 U.S.C. 154(b) by 48 days.

(21) Appl. No.: 10/476,490

(22) PCT Filed: Mar. 11, 2002

(86) PCT No.: PCT/EP02/02642

§ 371 (c)(1),
(2), (4) Date: Jan. 13, 2004

(87) PCT Pub. No.: WO02/093004

PCT Pub. Date: Nov. 21, 2002

(65) Prior Publication Data

US 2004/0120821 A1  Jun. 24, 2004

(30) Foreign Application Priority Data

May 11, 2001  (EP) ................................... 01111517

(51) Int. Cl.
*F03B 1/02* (2006.01)
(52) U.S. Cl. ................................................ 416/197 B
(58) Field of Classification Search .................... 416/1, 416/180, 197 R, 197 A, 197 B, 197 C, 228, 416/235, 236 R, 237; 415/1, 202; 29/407.05, 29/889, 889.21, 889.22, 889.5, 889.7, 889.72
See application file for complete search history.

(56) References Cited

U.S. PATENT DOCUMENTS

| 617,555 | A | * | 1/1899 | Blue ....................... 416/197 B |
| 875,161 | A | * | 12/1907 | Doble ..................... 416/197 B |
| 990,362 | A | * | 4/1911 | Kincaid .................. 416/197 B |
| 2,304,721 | A | * | 12/1942 | Werther ...................... 416/235 |
| 4,089,618 | A | * | 5/1978 | Patel .......................... 416/228 |

FOREIGN PATENT DOCUMENTS

| AT | | 60340 | A | * | 7/1918 | ............. 416/197 B |
| CA | | 514534 | A | * | 7/1955 | ............. 416/197 C |
| DE | | 3938356 | | | 12/1990 | |
| GB | | 2105791 | A | * | 3/1983 | ................. 416/228 |
| JP | | 58-15764 | | | 1/1983 | |

OTHER PUBLICATIONS

English Language Abstract of JP 58-15764.

* cited by examiner

*Primary Examiner*—Edward K. Look
*Assistant Examiner*—Devin Hanan
(74) *Attorney, Agent, or Firm*—Nixon & Vanderhye, P.C.

(57) ABSTRACT

Pelton bucket, Pelton wheel and a method of making and using the Pelton bucket. The Pelton bucket includes at least one exit edge. The at least one exit edge includes one of at least one partially concavely curved portion and at least one straight portion. The method of making provides for arranging at least one exit edge on the Pelton bucket. The method of using provides for causing rotation of a Pelton wheel with a Pelton turbine wherein the Pelton wheel utilizes a plurality of Pelton buckets and wherein the method provides for directing a jet from the Pelton turbine to the Pelton bucket to cause the Pelton wheel to rotate.

46 Claims, 5 Drawing Sheets

PELTON BUCKET

CROSS-REFERENCE TO RELATED APPLICATIONS

The present application is a National Stage Application of International Application No. PCT/EP02/02642, filed Mar. 11, 2002. Further, the present application claims priority under 35 U.S.C. § 119 of European Patent Application No. 01111517.7 filed on May 11, 2001.

BACKGROUND OF THE INVENTION

1. Field of the Invention

The invention relates to a Pelton bucket of a Pelton wheel, and to a method for producing a Pelton bucket.

2. Discussion of Background Information

Pelton buckets have been produced to date with flat exit edges. Preferably in the case of small circular jet ratios, that is to say when the buckets must be moved closer together to a very small circular jet diameter, the exit edges have frequently been leveled downward only at the cup base, since otherwise too little space remains at the cup base between the Pelton buckets for the water that is to flow off, the result being to reduce the deflection angle of the jet. The flat exit edges necessarily reduce the clear spans between successive buckets, less space therefore remains for the water that is to flow off. Moreover, the path length required for the deflection is thereby unnecessarily lengthened. All these disadvantages have a negative effect on the efficiency of the Pelton turbine.

SUMMARY OF THE INVENTION

The present invention therefore aims to optimize the deflection of the jet by a particularly shaped bucket, and thus to improve the efficiency of the Pelton turbine.

The invention therefore provides for a Pelton bucket, and a method for producing and/or making a Pelton bucket wherein the exit edge of the Pelton bucket of the Pelton wheel is concavely curved at least partially. Owing to this shape of the exit edge, optimum use is made of the kinetic energy of the jet during guidance in the Pelton bucket, and the energy is transferred to the Pelton wheel, resulting in an improvement in the efficiency of the Pelton turbine. It is possible overall to achieve thereby a gain in efficiency of 0.3 to 0.4%, which signifies a substantial gain given customary performances of a few hundred MW with Pelton turbines. This particular shape arises from an optimization of the deflection of the jet, and ensures that the jet is not guided beyond the path length required for proper deflection.

Moreover, the exit angle of the Pelton bucket can be further closed by way of this shape, something which likewise has a favorable effect on the efficiency of the Pelton turbine.

An additional effect of the lowering of the exit edge in the region of the middle of the cup is to create more room for the water flowing past from the cup upstream, resulting therefore in an increase in the clear span. As a direct consequence thereof, the exit angles of the Pelton bucket can be further closed in this region in order to preserve the optimum clear spans, and this again has a favorable effect on the efficiency of the Pelton turbine.

In an advantageous design, the exit edge of the Pelton bucket is raised in the region of the cup base by comparison with a flat exit edge, it thereby being possible to increase the deflection angle of the jet, and this has a positive effect, in accordance with the law of momentum, on the efficiency of a Pelton turbine. Given small circular jet ratios $D_1/B_2$, $D_1/B_2<3.3$, the aperture angle at the exit edge should be increased in the region of the cup base at the same time as the exit edge in this region is pulled up, in order to prevent the jet flowing out from grazing the subsequent bucket too strongly. The longer guidance of the jet in the bucket results, in particular, in a gain in efficiency.

A further advantageous embodiment is obtained when the exit edge is raised in the region of the bucket face by comparison with a flat exit edge, and this additionally permits clearance while optimizing the shape of the Pelton bucket.

In order to ensure the most fluent possible transitions of the bucket shape, the exit edge is curved, with reference to a radial plane of the Pelton wheel, advantageously at least partially convexly. It is thereby possible for the jet to be deflected during transition and without unnecessary losses in the Pelton bucket, and to emerge from the Pelton bucket. As an alternative to this, a simplification in the production of a Pelton bucket according to the invention can be achieved when the concavely and/or the convexly curved shape is approximated at least partially defined by a polygon.

The efficiency of the Pelton turbine is influenced positively when the outflow angle of the jet at the Pelton bucket is set by the shape of the exit edge such that the radial component of the exit speed of the jet is minimized. An additional improvement in the efficiency can be achieved when the outflow angle of the jet at the Pelton bucket is set by the shape of the exit edge such that the deflection of the jet is maximized with reference to 180° at least partially.

The efficiency can be yet further improved when the outflow angle at the Pelton bucket is set such that upon exiting from the Pelton bucket the jet only partially grazes the subsequent Pelton bucket.

Good optimization results can be achieved when the exit angle profile is firstly calculated, for example with the aid of numerical, fluid dynamic and/or mathematical models, and the fine tuning is carried out in model trials.

The invention also provides for a Pelton bucket comprising at least one exit edge. The at least one exit edge comprises one of at least one partially concavely curved portion and at least one straight portion that is arranged below a front edge.

The Pelton bucket may be arranged on a Pelton wheel. The at least one exit edge may comprise the at least one straight portion and the at least one straight portion may comprise a plurality of straight portions. One of the plurality of straight portions may be arranged at an angle to another of the plurality of straight portions.

A first of the plurality of straight portions may extend to one end of a second of the plurality of straight portions and may be arranged at an angle to the second of the plurality of straight portions, and a third of the plurality of straight portions may extend to another end of the second of the plurality of straight portions and may be arranged at an angle to the second of the plurality of straight portions, whereby the first, second and third straight portions are arranged below the front edge.

The at least one exit edge may comprise the at least one partially concavely curved portion and the at least one partially concavely curved portion may be adapted to extend to a lower point than a mean circular jet diameter.

The at least one exit edge may comprise the at least one partially concavely curved portion and the Pelton bucket may further comprise a front edge arranged on a bucket face that is arranged at a greater distance from a lower most part of an inner surface of the Pelton bucket than a lower most part of the at least partially concavely curved portion.

The at least one exit edge may comprise the at least one partially concavely curved portion and the Pelton bucket may further comprise a front edge arranged on a bucket face, wherein the at least partially concavely curved portion extends to a region of the front edge, whereby in the region, a part of the at least partially concavely curved portion is arranged at a greater distance from a lower most part of an inner surface of the Pelton bucket than a lower most part of the at least partially concavely curved portion.

The at least one exit edge may further comprise at least one partially convexly curved portion.

The at least one exit edge may comprise two exit edges which extend to a front edge of a bucket face of the Pelton bucket and each of the two exit edges may comprise one of at least one partially concavely curved portion and at least one straight portion that is arranged below the front edge.

The at least one exit edge may comprise the at least one straight portion that is arranged below the front edge and the at least one straight portion may form part of a polygonal shaped exit edge.

The at least one exit edge may be adapted to produce a jet outflow angle having a minimum jet exit speed radial component. The at least one exit edge may comprise a shape that is adapted to produce a jet outflow angle having a maximum deflection relative to 180 degrees. The at least one exit edge may be adapted to produce a flow having an optimal angular profile.

The invention also provides for a method of making a Pelton bucket, wherein the method comprises arranging at least one exit edge on the Pelton bucket, wherein the at least one exit edge includes one of at least one partially concavely curved portion and at least one straight portion that is arranged below a front edge.

The method may further comprise arranging the Pelton bucket on a Pelton wheel.

The at least one exit edge may comprise the at least one straight portion and the method may further comprise forming the at least one exit edge with additional straight portions. The method may further comprise arranging one of the additional straight portions at an angle to another of the additional straight portions. The method may further comprise arranging a first of the additional straight portions to extend to one end of the at least one straight portion and at an angle to the at least one straight portion and arranging a second of the additional straight portions to extend to another end of the at least one straight portion and at an angle to the at least one straight portion, whereby the first and second straight portion are arranged below the front edge.

The at least one exit edge may comprise the at least one partially concavely curved portion and wherein the at least one partially concavely curved portion is adapted to extend to a lower point than a mean circular jet diameter.

The at least one exit edge may comprise the at least one partially concavely curved portion and further comprising arranging a front edge on a bucket face at a greater distance from a lower most part of an inner surface of the Pelton bucket than a lower most part of the at least partially concavely curved portion.

The at least one exit edge may comprise the at least one partially concavely curved portion and the method may further comprise arranging a front edge on a bucket face, wherein the at least partially concavely curved portion extends to a region of the front edge and arranging, in the region, a part of the at least partially concavely curved portion at a greater distance from a lower most part of an inner surface of the Pelton bucket than a lower most part of the at least partially concavely curved portion.

The at least one exit edge may comprise the at least one partially concavely curved portion and the method may further comprise arranging at least a partially convexly curved portion on the at least one exit edge.

The at least one exit edge may comprise at least one straight portion that is arranged below the front edge and the method may further comprise arranging at least a partially convexly curved portion on the at least one exit edge.

The at least one exit edge may comprise at least one straight portion that is arranged below the front edge and the method may further comprise forming the at least one exit edge to have a polygonal shaped edge.

The at least one exit edge may be adapted to produce a jet outflow angle having a minimum jet exit speed radial component. The at least one exit edge may comprise a shape that is adapted to produce a jet outflow angle having a maximum deflection relative to 180 degrees. The at least one exit edge may be adapted to produce a flow having an optimal angular profile.

The method may further comprise calculating an optimal exit angle profile for the at least one exit edge using at least one of a numerical model, a fluid dynamic model, a mathematical model, and a plurality of model trials.

The method may further comprise ensuring that the at least one exit edge comprises an angular flow profile that is adapted to only partially graze a subsequent Pelton bucket when the Pelton bucket and subsequent Pelton bucket are arranged on a Pelton wheel.

The invention also provides for a method of causing rotation of a Pelton wheel with a Pelton turbine wherein the Pelton wheel utilizes a plurality of Pelton buckets of the type described above, wherein the method comprises directing a jet from the Pelton turbine to the Pelton bucket to cause the Pelton wheel to rotate.

The method may further comprise producing, with the at least one exit edge, a jet outflow angle having a minimum jet exit speed radial component.

The method may further comprise producing, with the at least one exit edge, a jet outflow angle having a maximum deflection relative to 180 degrees.

The method may further comprise producing, with the at least one exit edge, a flow having an optimal angular profile.

The invention also provides for a Pelton bucket adapted to be impinged by a jet, wherein the Pelton bucket comprises a front edge and two exit edges. Each of the two exit edges comprises one of at least one partially concavely curved portion and at least one straight portion that is arranged below the front edge.

The Pelton bucket may further comprise a centrally disposed straight edge separating the Pelton bucket into two portions, wherein the front edge extends above the centrally disposed straight edge.

The Pelton bucket may further comprise a centrally disposed straight edge separating the Pelton bucket into two portions, wherein the two exit edges comprise portions that extend above the centrally disposed straight edge.

The invention also provides for a Pelton wheel comprising a plurality of buckets. Each of the plurality of buckets is adapted to be impinged by a jet and comprises a front edge and two exit edges. Each of the two exit edges comprises one of at least one partially concavely curved portion and at least one straight portion that is arranged below the front edge.

Each of the plurality of buckets may further comprise a centrally disposed straight edge separating each bucket into two portions, wherein the front edge extends above the centrally disposed straight edge.

Each of the plurality of buckets may further comprise a centrally disposed straight edge separating each bucket into two portions, wherein the two exit edges comprise portions that extend above the centrally disposed straight edge.

BRIEF DESCRIPTION OF THE DRAWINGS

The invention is described with the aid of the schematic, exemplary and non-restrictive FIGS. 1 to 4, in which:

FIGS. 2*a* to 2*e* a comparison of a Pelton bucket having a flat exit edge (FIG. 2*a*) with Pelton buckets (FIGS. 2*b* to 2*d*) according to the invention, wherein FIG. 2*b* shows a Pelton bucket with a concave smooth curvature on the exit edge, FIG. 2*c* shows a Pelton bucket with a concave curvature formed by straight edge lines, and FIG. 2*d* shows another Pelton bucket having a convex and concave curvature on the exit edge;

DETAILED DESCRIPTION OF THE INVENTION

Figure 1:
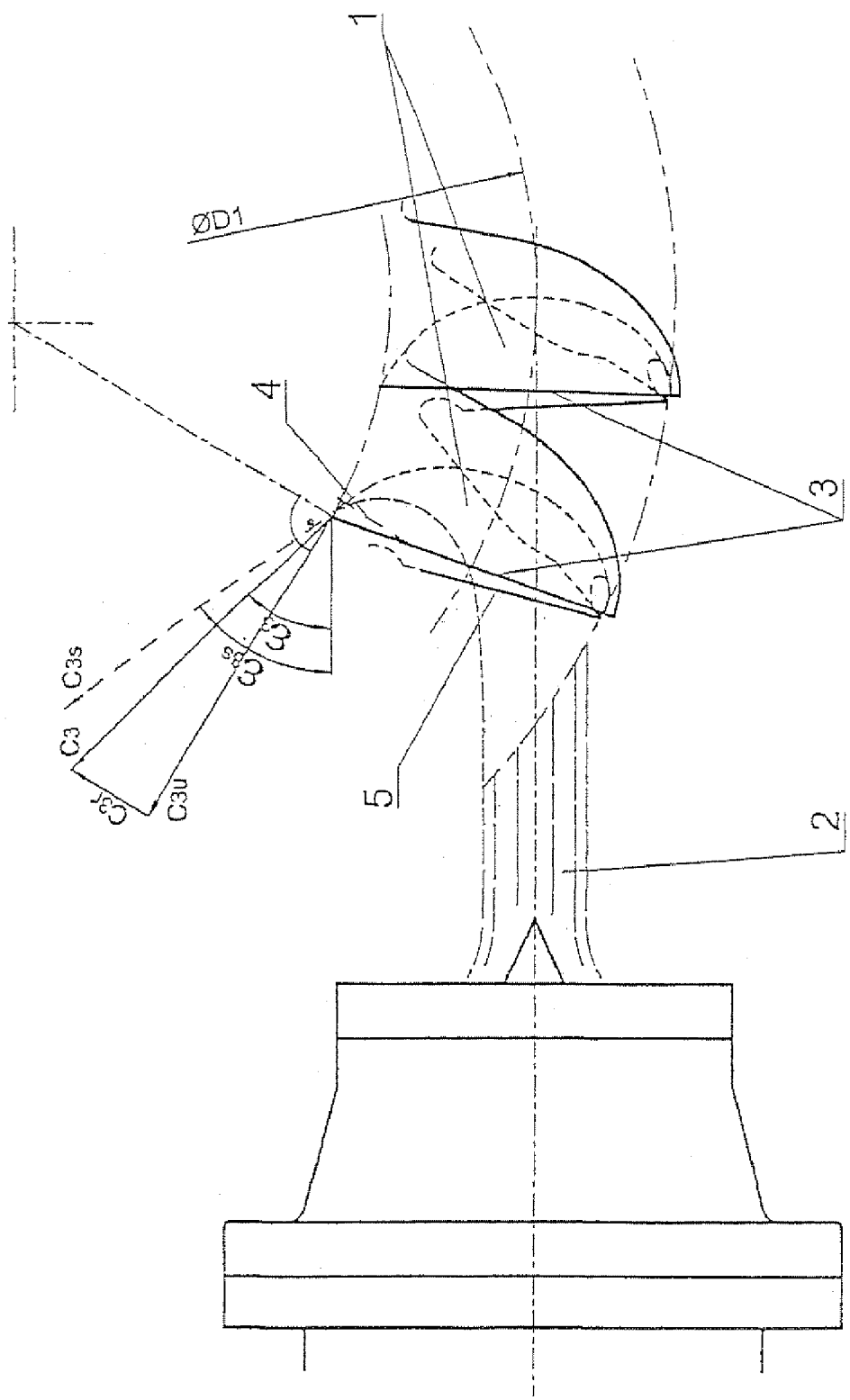
FIG. 1 shows the outflow of the jet at a Pelton bucket having a flat exit edge.

Rotating about an axis of rotation in a housing is a Pelton turbine to which a medium, which is mostly water, is applied from a pressure pipeline via a jet 2, or simultaneously via a plurality of jets, in a fashion tangential to a mean circular jet diameter $D_1$. The medium moving in a translatory fashion enters the rotating Pelton bucket 1 through a cutout in the bucket face, is bifurcated at the bucket blade 5, deflected in the two cups of the Pelton bucket 1, and leaves the Pelton bucket 1 to both sides over the outer bucket rim, as illustrated schematically in FIG. 1 and FIG. 2.

According to the law of momentum, the force F on a stationary Pelton bucket 1 is yielded as $$F=(1+\cos \epsilon_3)\rho A c^2.$$

Here, $\epsilon_3$ is the outflow angle with reference to the entrance axis of the jet 2, $\rho$ is the density of the medium, c the jet speed and A the jet cross section. As may be seen from the relationship for the force, the force is maximized when $\epsilon_3$ vanishes, that is to say when the medium is deflected by 180°. Since the Pelton wheel rotates with the Pelton buckets 1, in the case of conventional Pelton wheels, that is to say with a flat exit edge 3, deflection angles of between approximately 130° to 180° in terms of phase result with reference to the entrance axis.

According the Euler turbine equation, $$P=\rho Q(u_3 c_{3u} - u_0 c_{0u}),$$

the performance P of the Pelton turbine is at a maximum when the medium flows out of the impeller in the circumferential direction (index u), that is to say when there is no radial component (index r) of the jet speed c and it holds that $$c_{3r}=0 \Rightarrow c_3 = c_{3u}.$$

$\rho$ in this case again denotes the density of the medium, Q the volumetric flow and u the circumferential speed of the bucket. The index 0 relates to the entrance of the jet into the Pelton bucket 1, and the index 3 to the exit from the Pelton bucket 1. Thus, for optimum operation of a Pelton turbine, the deflection angle should be maximized during the entire deflection phase with reference to 180°, and at the same time the exit speed $c_3$ should have only a circumferential component $c_{3u}$.

FIG. 1 shows a Pelton wheel that has two conventional Pelton buckets 1 and to which a jet 2 is applied. The jet 2 is bifurcated at the bucket blade 5, is deflected in the cups and exits at the outflow angle $\epsilon_3$ from the Pelton bucket 1. In conventional Pelton buckets, the outflow angle $\epsilon_3$ is approximately 40° to 50°. The exit angle profile caused by the flat exit edge 3, results in an exit speed $c_3$, which has a radial component $c_{3r}$, with the disadvantages known from the above discussion. In order to prevent the outflowing water from grazing the subsequent Pelton bucket 1 too strongly, which would have a negative effect on the performance of the Pelton turbine, a beveled exit edge 4 is often provided in the region of the cup base. Consequently, although upon exiting the water does graze the outside of the subsequent Pelton bucket 1 less, the outflow angles $\epsilon_{3S}$ are increased even more, and the resulting exit speed $c_{3S}$ therefore has a still larger radial component. It is directly evident on the basis of the above discussion that the efficiency of the Pelton turbine is thereby degraded.

Figure 2A:
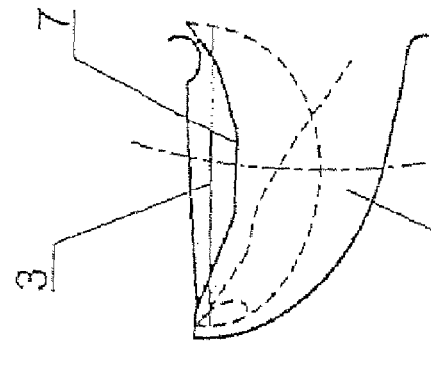

A single conventional Pelton bucket 1 having a flat exit edge 3 is illustrated in FIG. 2*a*. Contrasting in FIGS. 2*b*, 2*c* and 2*e* (which is an enlarged view of the bucket shown in FIG. 2*c* with imaginary lines 10 added to highlight the convex and concave portions of the exit edge of the bucket) with this conventional Pelton bucket 1 are inventive Pelton buckets 1 in which a flat exit edge 3 is indicated as a comparison in each case. It can be seen in FIG. 2*b* that the exit edge 6 of the inventive Pelton bucket has a concave curvature. A concave curvature is understood here by definition as a curvature whose center of curvature in a side view of the Pelton bucket 1 according to FIG. 2*a* comes to lie above the exit edge. A convex exit edge consequently has a center of curvature below the exit edge 6, that is to say in the Pelton bucket body itself, for example. Furthermore, the exit edge 6 is lowered in the region of the middle of the cup, that is to say around the circular jet diameter $D_1$, by comparison with the flat exit edge 3, and is raised in the region of the cup base by comparison with the flat exit edge 3, the overall result being a running, concavely curved exit edge 6. In particular, in the case of this exemplary embodiment, a contour is thus produced with reference to a radial plane of the Pelton wheel which has a running, convexly curved shape at the bucket face and then goes over into a running, concavely curved shape up to the cup face. Other shapes are of course also conceivable and possible. This shape is yielded from an optimization with regard to the minimization of the radial component $c_{3r}$ of the exit speed $c_3$, advantageously $c_{3r}=0$. Further factors featuring in the optimization are the minimization of the outflow angle $\epsilon_3$, with regard to a maximum deflection angle with reference to 180°, and the path length required for the proper deflection of the jet 2 in the Pelton bucket 1.

The optimization of the curved exit edge is carried out with the aid of computational models, for example numerical, fluid dynamic or mathematical models, and verified in subsequent model trials and/or simulations. Of course, it is also possible to optimize the shape only by way of model trials. The following value ranges have proved to be advantageous in practice for this purpose.

Figure 2B:
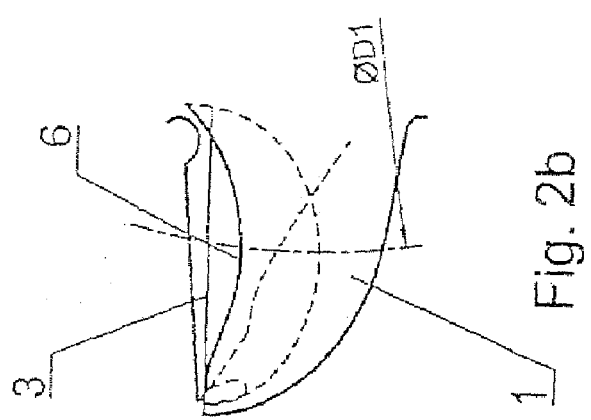
Figure 2C:
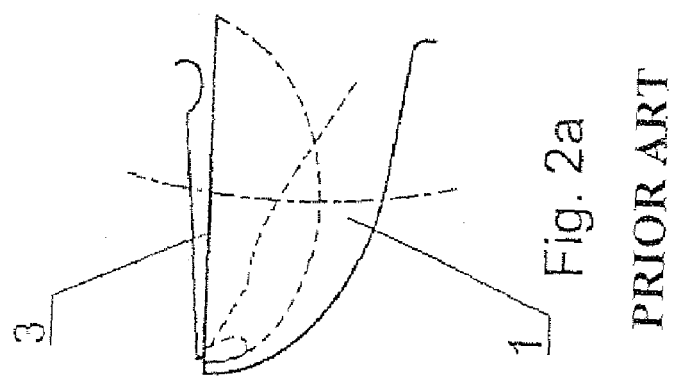
Figure 2D:
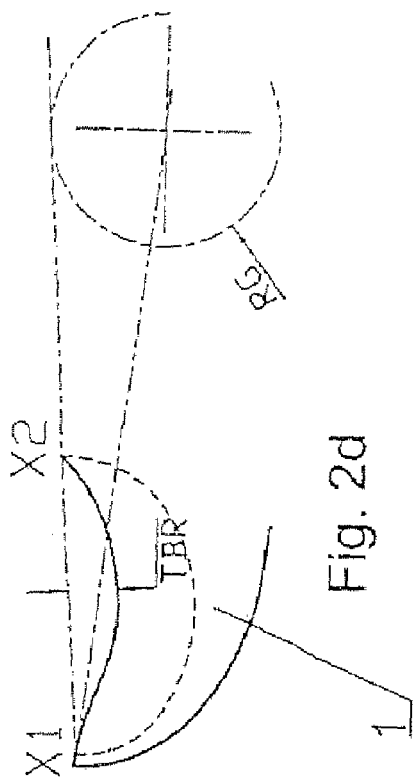
Figure 2E:
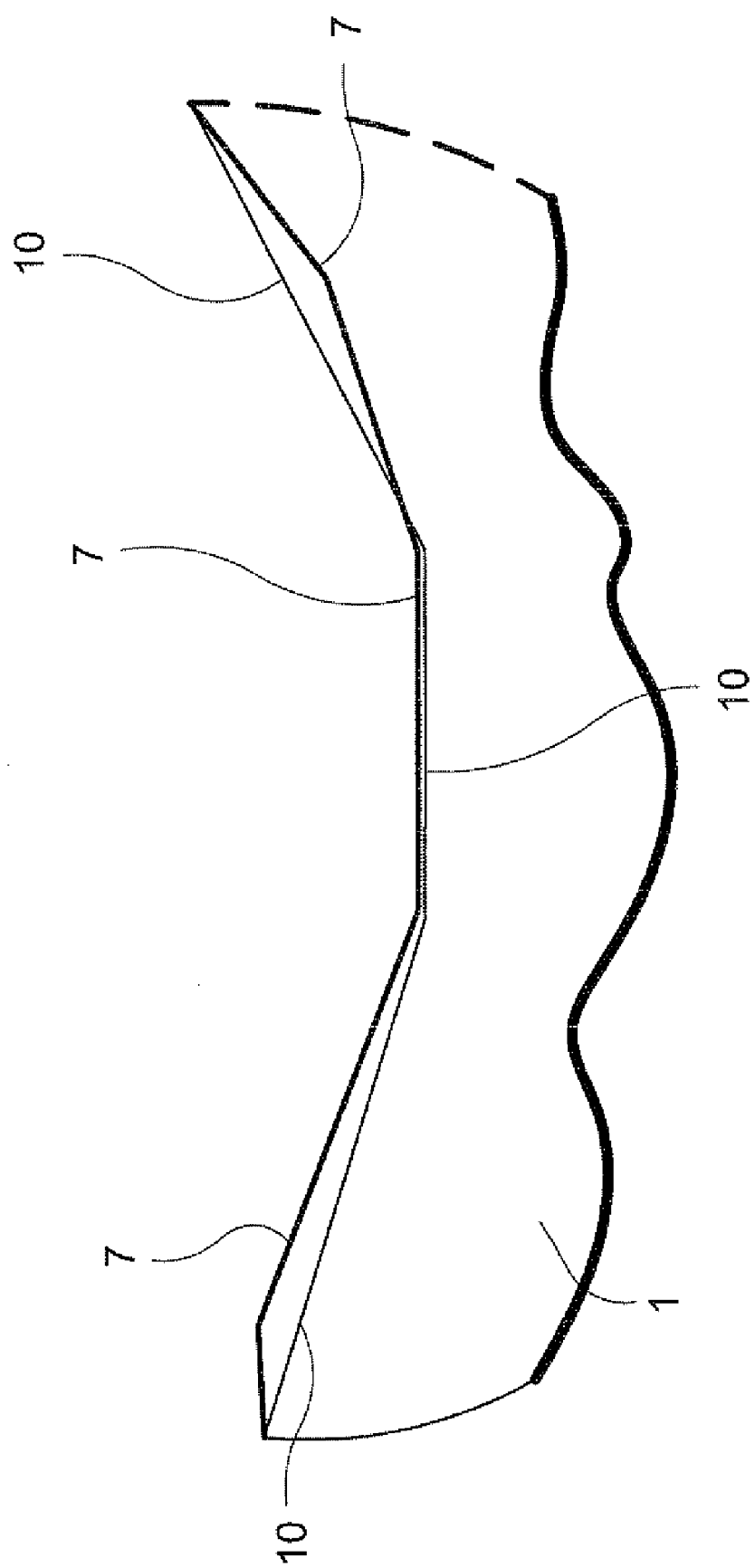

FIG. 2*d* shows two points X1 and X2 that result from the point of intersection of the curved exit edge 6 and the inside of a cup. The basic circle with the radius $R_G$ about the Pelton wheel axis is then yielded as the circle that is tangent to the extension of the line X1-X2. As is known to persons skilled in the art, for Pelton wheels the radius is to be $R_G=(0.25$ to $0.85)B_2$ in the case of circular jet ratios $D_1/B_2 \approx 6$, while the radius is $R_G=(0.55$ to $1.2)B_2$ in the case of $D_1/B_2 \approx 3$. The depth $T_{BR}$ of the curved exit edge 6 in the region of the circular jet diameter $D_1$ should then be in the range of $T_{BR}=(0.03$ to $0.17)B_2$. $B_2$ in this case denotes the width of the Pelton bucket 1, as illustrated in FIG. 4.

The curved exit edge has been approximated by a polygon 7 in FIG. 2c. It can further be seen that, in addition, the exit edge 7 is further raised in the region of the bucket face by comparison with the flat exit edge 3. This arrangement is, of course, also possible with curved exit edges 6.

Figure 3:
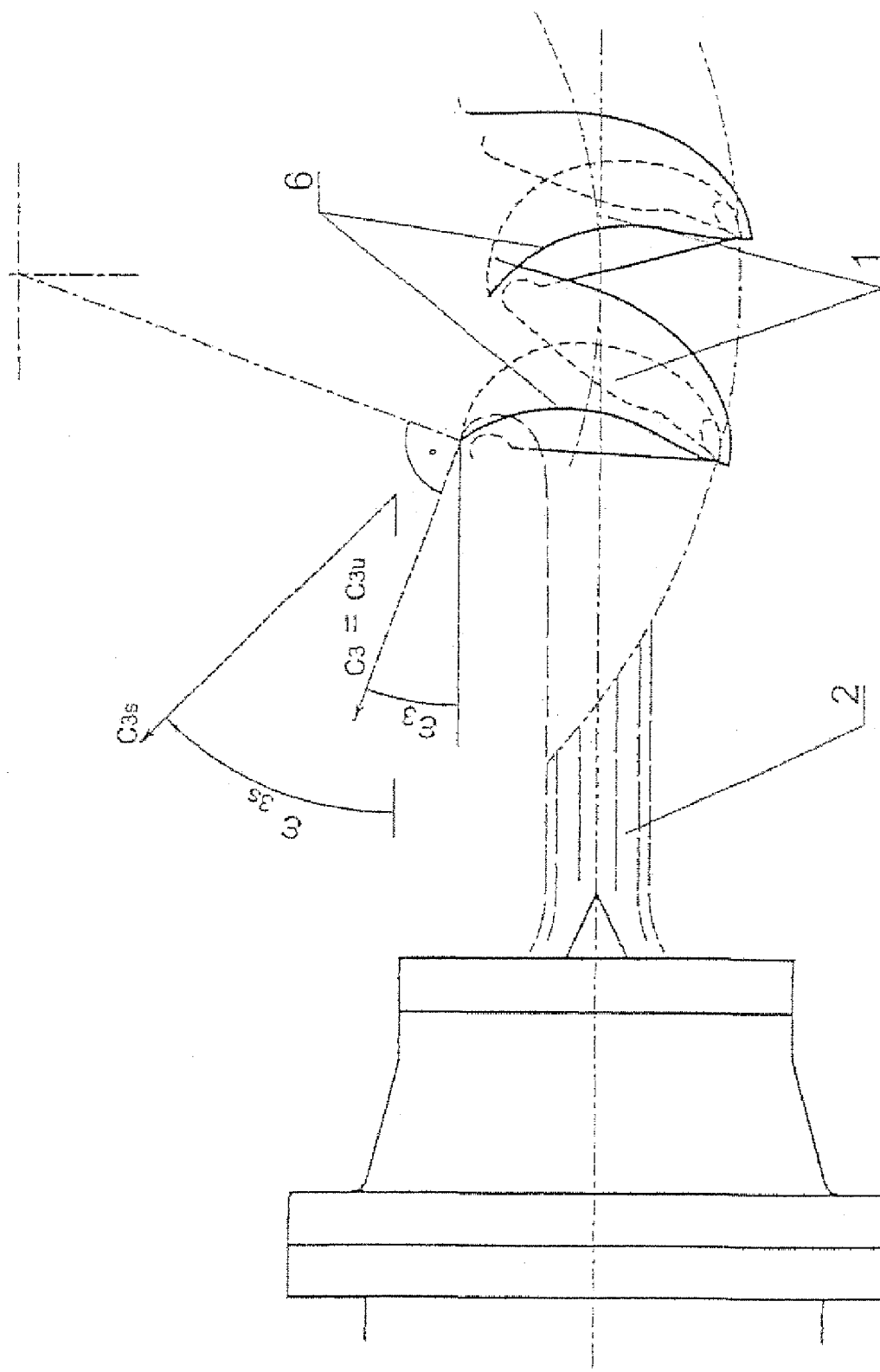
FIG. 3 shows the outflow of the jet at an inventive Pelton bucket.

FIG. 3 shows a Pelton wheel, which is indicated by two Pelton buckets 1 having a concavely curved exit edge 6, and to which a jet 2 is applied. The outflow angle $\epsilon_3$ resulting from the deflection is yielded in this exemplary embodiment in such a way that the radial component $c_{3r}$ of the exit speed $c_3$ optimally vanishes, and it is only the circumferential component that continues to remain, and so it holds that $c_3 = c_{3u}$. As a comparison, the exit speed $c_{3S}$ of a conventional Pelton bucket 1 is indicated and has a radial component on the basis of the larger exit angle $\epsilon_{3S}$.

Figure 4:
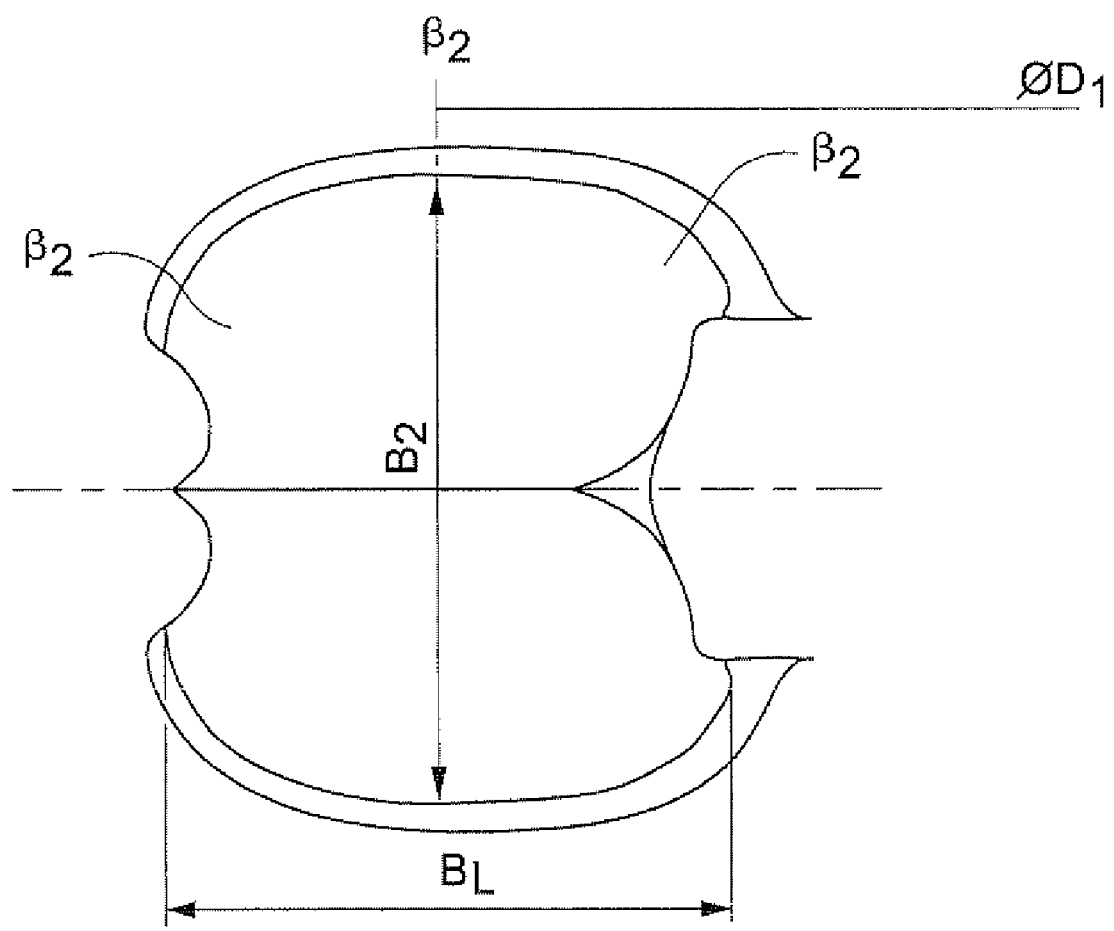
FIG. 4 shows a plan view of an inventive Pelton bucket.

FIG. 4 shows a top view of the Pelton bucket of FIG. 2b and illustrates the front edge FE, the first exit edge FEE, the second exit edge SEE, and the rear edge RE. The exit angle profile over the Pelton bucket length $B_L$ is indicated in FIG. 4 at three points by the respective exit angle $\beta_2$. The exit angles $\beta_2$ are set such that the deflected jet does not graze the outer surface of the subsequent Pelton bucket too strongly. An optimum exit angle profile exits in this case for each circular jet ratio $D_1/B_2$. This exit angle profile can be calculated and/or simulated with the aid of numerical, fluid dynamic and/or mathematical models, or is determined in model trials. Of course, any desired combination of the methods for determining the optimum exit angle profile can also be applied.

The invention claimed is:

1. A Pelton bucket comprising:
   a front edge;
   a rear edge;
   at least one exit edge extending between the front and rear edges;
   the at least one exit edge comprising one of:
   at least one partially concavely curved portion; and
   at least one straight portion,
   wherein the at least one exit edge comprises a portion below an imaginary line extending between the front and the rear edges of the Pelton bucket.

2. The Pelton bucket of claim 1, wherein the Pelton bucket is arranged on a Pelton wheel.

3. The Pelton bucket of claim 1, wherein the at least one exit edge comprises the at least one straight portion and wherein the at least one straight portion comprises a plurality of straight portions.

4. The Pelton bucket of claim 3, wherein one of the plurality of straight portions is arranged at an angle to another of the plurality of straight portions.

5. The Pelton bucket of claim 1, wherein a portion of the at least one exit edge in the region of a bucket base is arranged above the imaginary line extending between the front and the rear edges of the Pelton bucket.

6. The Pelton bucket of claim 1, wherein a portion of the at least one exit edge in a region of
   a mean circular jet diameter is arranged below the imaginary line extending between the front and the rear edges of the Pelton bucket.

7. The Pelton bucket of claim 1, wherein the at least one exit edge comprises the at least one partially concavely curved portion and wherein the front edge is arranged on a bucket face and arranged at a greater distance from a lower most part of an inner surface of the Pelton bucket than a lower most part of the at least partially concavely curved portion.

8. The Pelton bucket of claim 1, wherein the at least one exit edge comprises the at least one partially concavely curved portion and wherein the front edge is arranged on a bucket face, wherein the at least partially concavely curved portion extends to a region of the front edge, whereby in the region, a part of the at least partially concavely curved portion is arranged at a greater distance from a lower most part of an inner surface of the Pelton bucket than a lower most part of the at least partially concavely curved portion.

9. The Pelton bucket of claim 1, wherein the at least one exit edge further comprises at least one partially convexly curved portion.

10. The Pelton bucket of claim 1, wherein the Pelton bucket comprises two exit edges which extend to the front edge of a bucket face of the Pelton bucket and wherein at least one of the two exit edges comprises one of at least one partially concavely curved portion and at least one straight portion, wherein the at least one of the two exit edges comprises a portion that is arranged below the imaginary line extending between the front and the rear edges of the Pelton bucket.

11. The Pelton bucket of claim 1, wherein the at least one exit edge comprises the at least one straight portion and wherein the at least one straight portion forms part of a polygonal shaped exit edge.

12. The Pelton bucket of claim 1, wherein the at least one exit edge is adapted to produce a jet outflow angle having a minimum jet exit speed radial component.

13. The Pelton bucket of claim 1, wherein the at least one exit edge comprises a shape that is adapted to produce a jet outflow angle having a maximum deflection relative to 180 degrees.

14. The Pelton bucket of claim 1, wherein the at least one exit edge is adapted to produce a flow having an optimal angular profile.

15. A method of causing rotation of a Pelton wheel with a Pelton turbine wherein the Pelton wheel utilizes a plurality of Pelton buckets of claim 1, the method comprising:
   directing a jet from the Pelton turbine to the Pelton bucket to cause the Pelton wheel to rotate.

16. The method of claim 15, further comprising producing, with the at least one exit edge, a jet outflow angle having a minimum jet exit speed radial component.

17. The method of claim 15, further comprising producing, with the at least one exit edge, a jet outflow angle having a maximum deflection relative to 180 degrees.

18. The method of claim 15, further comprising producing, with the at least one exit edge, a flow having an optimal angular profile.

19. The Pelton bucket of claim 1, wherein a contour of the at least one exit edge has an outflow angle which minimizes a radial component of an exit speed.

20. The Pelton bucket of claim 1, wherein a portion of the at least one exit edge in the region of a bucket face is arranged above the imaginary line extending between the front and the rear edges of the Pelton bucket.

21. A method of making a Pelton bucket, the method comprising:
   arranging at least one exit edge between front and rear edges on the Pelton bucket, wherein the at least one exit edge includes one of at least one partially concavely curved portion and at least one straight portion, and wherein the at least one exit edge comprises a portion that is arranged below an imaginary line extending between the front and the rear edges of the Pelton bucket.

22. The method of claim 21, further comprising arranging the Pelton bucket on a Pelton wheel.

23. The method of claim 21, wherein the at least one exit edge comprises at least one straight portion and further comprising forming the at least one exit edge with additional straight portions.

24. The method of claim 23, further comprising arranging one of the additional straight portions at an angle to another of the additional straight portions.

25. The method of claim 21, wherein a portion of the at least one exit edge in a region of a mean circular jet diameter is below the imaginary line extending between the front and the rear edges of the Pelton bucket.

26. The method of claim 21, wherein the at least one exit edge comprises the at least one partially concavely curved portion and further comprising arranging the front edge on a bucket face at a greater distance from a lower most part of an inner surface of the Pelton bucket than a lower most part of the at least partially concavely curved portion.

27. The method of claim 21, wherein the at least one exit edge comprises the at least one partially concavely curved portion and further comprising:

arranging the front edge on a bucket face, wherein the at least partially concavely curved portion extends to a region of the front edge; and arranging, in the region, a part of the at least partially concavely curved portion at a greater distance from a lower most part of an inner surface of the Pelton bucket than a lower most part of the at least partially concavely curved portion.

28. The method of claim 21, wherein the at least one exit edge comprises the at least one partially concavely curved portion and wherein the method further comprises arranging at least a partially convexly curved portion on the at least one exit edge.

29. The method of claim 21, wherein the at least one exit edge comprises at least one straight portion and wherein the method further comprises arranging at least a partially convexly curved portion on the at least one exit edge.

30. The method of claim 21, wherein the at least one exit edge comprises at least one straight portion and wherein the method further comprises forming the at least one exit edge to have a polygonal shaped edge.

31. The method of claim 21, wherein the at least one exit edge is adapted to produce a jet outflow angle having a minimum jet exit speed radial component.

32. The method of claim 21, wherein the at least one exit edge comprises a shape that is adapted to produce a jet outflow angle having a maximum deflection relative to 180 degrees.

33. The method of claim 21, wherein the at least one exit edge is adapted to produce a flow having an optimal angular profile.

34. The method of claim 21, further comprising:

calculating an optimal exit angle profile for the at least one exit edge using at least one of a numerical model, a fluid dynamic model, a mathematical model, and a plurality of model trials.

35. The method of claim 21, further comprising:

ensuring that the at least one exit edge comprises an angular flow profile that is adapted to only partially graze a subsequent Pelton bucket when the Pelton bucket and subsequent Pelton bucket are arranged on a Pelton wheel.

36. The method of claim 21, wherein a portion of the at least one exit edge in the region of a bucket base is arranged above the imaginary line extending between the front and the rear edges of the Pelton bucket.

37. The method of claim 21, wherein a portion of the at least one exit edge in a region of a mean circular jet diameter is arranged below the imaginary line extending between the front and the rear edges of the Pelton bucket.

38. The method of claim 21, wherein a portion of the at least one exit edge in the region of a bucket face is arranged above the imaginary line extending between the front and the rear edges of the Pelton bucket.

39. A Pelton bucket adapted to be impinged by a jet, the Pelton bucket comprising:

a front edge, a rear edge, and two exit edges;

each of the two exit edges comprising:

at least one partially concavely curved portion; and at least one straight portion, wherein the two exit edges each comprise a portion that is arranged below an imaginary segmented line including a line segment defined by the at least one straight portion, a line-segment extending between the front edge of the Pelton bucket and a first end of the at least one straight portion, and a line segment extending between the rear edge of the Pelton bucket and a second end of the at least one line segment.

40. The Pelton bucket of claim 39, wherein a portion of each of the exit edges proximate to a bucket base extends above the imaginary segmented line extending between the front and rear edges of the Pelton bucket.

41. The Pelton bucket of claim 39, wherein a portion of each of the two exit edges proximate to a bucket face is arranged above the imaginary segmented line extending between the front and rear edges of the Pelton bucket.

42. The Pelton bucket of claim 39, wherein a contour of each of the two exit edges has an outflow angle which minimizes a radial component of an exit speed.

43. A Pelton wheel comprising:

a plurality of buckets;

each of the plurality of buckets being adapted to be impinged by a jet and comprising a front edge and two exit edges;

at least one of the two exit edges comprising:

at least one partially concavely curved portion; and at least one straight portion, wherein the at least one of the two exit edges comprise a portion that is arranged below an imaginary segmented line including a line segmented defined by the at least one straight portion, a line segment extending between the front edge of the Pelton bucket and a first end of the at least one straight portion, and the at least one of the two rear edges of the Pelton bucket and a second end of the at least one straight portion.

44. The Pelton wheel of claim 43, wherein the straight portion is between a convex portion and the concavely curved portion.

45. The Pelton wheel of claim 43, wherein a portion of the at least one of the two exit edges near the region of a bucket face is arranged above the imaginary segmented line extending between the front and the rear edges of the Pelton bucket.

46. The Pelton wheel of claim 43, wherein a contour of each of the two exit edges has an outflow angle which minimizes a radial component of an exit speed.

* * * * *